(12) United States Patent
Nien et al.

(10) Patent No.: US 8,830,166 B2
(45) Date of Patent: Sep. 9, 2014

(54) SLEEVE AND CONTROL DEVICE WITH SUCH SLEEVE

(75) Inventors: Chung-Yueh Nien, New Taipei (TW); Tian-Fu Pan, New Taipei (TW); Cheng-Yi Huang, New Taipei (TW)

(73) Assignee: Ergzon Co., Ltd., Changhua County (TW)

( * ) Notice: Subject to any disclaimer, the term of this patent is extended or adjusted under 35 U.S.C. 154(b) by 266 days.

(21) Appl. No.: 13/537,327

(22) Filed: Jun. 29, 2012

(65) Prior Publication Data
US 2013/0033420 A1 Feb. 7, 2013

(30) Foreign Application Priority Data

Aug. 1, 2011 (TW) .............................. 100214153 U (51) Int. Cl.
| | |
|---|---|
| *G09G 5/00* | (2006.01) |
| *G06F 3/033* | (2013.01) |
| *G06F 3/0354* | (2013.01) |
| *G06F 3/0362* | (2013.01) |
| *G06F 1/16* | (2006.01) |

(52) U.S. Cl.
CPC .............. *G06F 1/169* (2013.01); *G06F 3/0354* (2013.01); *G06F 3/0362* (2013.01)
USPC .......................................... 345/156; 345/157

(58) Field of Classification Search
USPC ................................... 345/156–160
See application file for complete search history.

(56) References Cited

U.S. PATENT DOCUMENTS

| | | | |
|---|---|---|---|
| 6,337,680 B1 * | 1/2002 | Hamaji .......................... | 345/157 |
| 2008/0278444 A1 * | 11/2008 | Schelling et al. ............. | 345/157 |
| 2011/0037693 A1 * | 2/2011 | Chiang ......................... | 345/157 |
| 2011/0134031 A1 * | 6/2011 | Wang et al. .................. | 345/157 |

* cited by examiner

*Primary Examiner* — Vijay Shankar
*Assistant Examiner* — Amit Chatly
(74) *Attorney, Agent, or Firm* — WPAT, PC; Justin King (57) ABSTRACT

A sleeve of control device is provided for controlling a cursor motion of an electronic device. A touch-feel enhancing mechanism is formed on an outer surface of the sleeve. The touch-feel enhancing mechanism is not related to the function of operating the control device to detect the rotating action or the moving action by the user. The touch-feel enhancing mechanism is only used to enhance comfort and touch feel of operating the control device.

23 Claims, 11 Drawing Sheets

SLEEVE AND CONTROL DEVICE WITH SUCH SLEEVE

FIELD OF THE INVENTION

The present invention relates to a sleeve for a control device, and more particularly to a sleeve for a control device that controls a cursor shown on a display screen.

BACKGROUND OF THE INVENTION

With increasing development of the modern technologies and the electronic industries, a variety of electronic devices such as computers, notebook computers, mobile phones or digital cameras have become indispensable parts of the human lives. Furthermore, most users may frequently come into contact with computers. By using a mouse, a keyboard or any other peripheral device to operate the computer, the selecting, dragging or circumscribing function through the cursor motion or the typing function through the keyboard may be achieved.

Nowadays, many peripheral devices are developed to replace the mouse, or a keyboard and a mouse are combined together in order to operate the computer. For example, a multiple-cylinder control device is disclosed in U.S. Pat. No. 6,300,938. The surface of the cylinder has a pattern indicative of a resolution. In response to movement or rotation of the cylinder, the sensor outside the cylinder may detect the resolution of the surface of the cylinder, thereby issuing a signal to control the motion of a cursor shown on the display screen. Furthermore, a single-cylinder control device is disclosed in U.S. Pat. No. 6,337,680. The surface of the cylinder also has a pattern indicative of a resolution. Furthermore, a loop means for a pointing device is disclosed in Chinese Patent No. CN 1813235. The loop means is equipped with a friction material and intermediate flexing zones. The surface of the loop means is equipped with strips parallel to the longitudinal axis of the loop means for stiffening the loop means. Moreover, the support layer disposed on the outer surface of the loop means has a considerable thickness change.

However, the above techniques still have some drawbacks. For example, since the pattern indicative of the resolution should be formed on the hard material to achieve the accurate and precise resolution, the fabricating process is very complicated. On the other hand, since the structure for stiffening the loop means is formed on the flexible material, the considerable thickness change is detrimental to the comfort of operating the loop means for a long time.

SUMMARY OF THE INVENTION

For eliminating the drawbacks from the prior art, the present invention provides a sleeve for a control device and the control device. In the control device of the present invention, a touch-feel enhancing mechanism is formed on a surface of the sleeve in order to enhance the touch feel of operating the control device while the flexibility of the sleeve is taken into consideration.

The present invention also provides a sleeve for a control device and the control device, in which convex structures or the concave structures are formed on the surface of the sleeve in order to enhance comfort and touch feel of operating the control device.

The present invention further provides a sleeve for a control device and the control device. The convex structures or the concave structures on the outer surface of the sleeve are not responsible for providing the functions of serving as resolutions. Consequently, the convex structures or the concave structures on the surface of the sleeve may have various geometric profiles in order to enhance touch feel and the comfort.

In accordance with a first aspect of the present invention, there is provided a control device for controlling a cursor motion of an electronic device. The control device includes a holder, a flexible sleeve, and a detecting module. The holder has an accommodation space therein. The flexible sleeve is sheathed around the holder, and rotatable and movable on the holder. A touch-feel enhancing mechanism is formed on an outer surface of the flexible sleeve. The detecting module is used for detecting at least one of a rotating action and a moving action of the flexible sleeve, thereby generating a control signal to control the cursor motion of the electronic device.

In an embodiment, the touch-feel enhancing mechanism includes a convex structure or a concave structure as a unit structure. The unit structure is not responsible for providing a function of being detected by the detecting module. Moreover, the unit structure has a geometric profile selected from at least one of a point shape, a block shape and a strip shape which is not parallel with a longitudinal direction of the flexible sleeve.

In an embodiment, the touch-feel enhancing mechanism includes a convex structure or a concave structure as a unit structure. When the touch-feel enhancing mechanism includes a plurality of unit structures, the unit structures are not responsible for providing a function of being detected by the detecting module, and the unit structures are regularly or irregularly distributed on the outer surface.

In an embodiment, the touch-feel enhancing mechanism includes a convex structure or a concave structure as a unit structure. When the touch-feel enhancing mechanism includes a plurality of unit structures, the unit structures are not responsible for providing a function of being detected by the detecting module, and the unit structures are continuously or discontinuously distributed on the outer surface.

In an embodiment, the flexible sleeve is constituted by a single supporting layer or a composite supporting layer, wherein the composite supporting layer further includes a reinforcing layer.

In an embodiment, the detecting module is accommodated within the accommodation space. Alternatively, the control device further includes a microprocessor, and the microprocessor and the detecting module are disposed within the accommodation space.

In an embodiment, the holder further includes a first surface near a force-exerting position of the user and a second surface connected with the first surface and facing the accommodation space. If at least one of the first surface and the second surface includes a transparent structure, a detecting surface of the detecting module faces the transparent structure and an inner surface of the flexible sleeve which is opposed to the outer surface. Alternatively, if the second surface includes a vacant zone, a detecting surface of the detecting module faces the vacant zone and an inner surface of the flexible sleeve which is opposed to the outer surface. Alternatively, the detecting module has a detecting surface and the flexible sleeve has an inner surface opposed to the outer surface, and the first surface or the second surface is not arranged between the detecting surface and the inner surface, so that the detecting surface is located beside the inner surface.

In an embodiment, the control device further includes a housing for accommodating the holder, a positioning shaft, a pushing seat including a magnetic element, a pressing element and a sensing unit. The positioning shaft, the pushing seat, the pressing element and the sensing unit are all accommodated within the housing. The holder is fixed on the pressing element. The pressing element is rotatably fixed on an end of the positioning shaft. The end of the positioning shaft is penetrated through the pushing seat and sustained against the pressing element. When an external force is exerted on the pushing seat through the flexible sleeve, a distance between the pushing seat and the pressing element is changed, so that a change of a magnetic field of the magnetic element is received by the sensing unit.

In an embodiment, the control device further includes a control switch, which is disposed within the housing and disposed under a touching part of the pressing element. In response to a downward force exerted on the holder, the touching part is driven to press the control switch, so that the control switch is triggered to generate a signal.

In accordance with a second aspect of the present invention, there is provided a control device for controlling a cursor motion of an electronic device. The control device includes a holder, a sleeve, and a detecting module. The sleeve is disposed on the holder, and rotatable and movable on the holder. The detecting module is used for detecting a rotating action and a moving action of the sleeve. A touch-feel enhancing mechanism is formed on an outer surface of the sleeve, and the touch-feel enhancing mechanism includes a plurality of unit structures which are not parallel with a longitudinal direction of the sleeve.

In an embodiment, the unit structures are convex structures or concave structures. The convex structures or the concave structures are not responsible for providing a function of being detected by the detecting module. Moreover, each of the convex structures or the concave structures has a geometric profile selected from at least one of a point shape, a block shape and a strip shape.

In an embodiment, the unit structures are convex structures or concave structures. The convex structures or the concave structures are not responsible for providing a function of being detected by the detecting module. Moreover, the convex structures or the concave structures are regularly or irregularly distributed on the outer surface.

In an embodiment, the unit structures are convex structures or concave structures. The convex structures or the concave structures are not responsible for providing a function of being detected by the detecting module. Moreover, the convex structures or the concave structures are continuously or discontinuously distributed on the outer surface.

In an embodiment, the sleeve is rotatable and/or movable on the holder. Alternatively, the sleeve is rotatable and/or movable relative to at least one portion of the holder.

In an embodiment, the sleeve is constituted by a single supporting layer or a composite supporting layer, wherein the composite supporting layer further includes a reinforcing layer.

In an embodiment, the touch-feel enhancing mechanism is constituted by the single supporting layer, or constituted by at least one portion of the composite supporting layer, or constituted by a friction enhancing structure with a friction coefficient identical to the reinforcing layer.

In an embodiment, the holder includes a first surface, a second surface and an accommodation space. The first surface is near a force-exerting position of the user. The second surface is connected with the first surface. The accommodation space faces the second surface. Moreover, the detecting module is accommodated within the accommodation space.

In an embodiment, if at least one of the first surface and the second surface includes a transparent structure, a detecting surface of the detecting module faces the transparent structure and an inner surface of the sleeve which is opposed to the outer surface. Alternatively, if the second surface includes a vacant zone, a detecting surface of the detecting module faces the vacant zone and an inner surface of the sleeve which is opposed to the outer surface. Alternatively, the detecting module has a detecting surface and the sleeve has an inner surface opposed to the outer surface, and the first surface or the second surface is not arranged between the detecting surface and the inner surface, so that the detecting surface is located beside the inner surface.

In an embodiment, the control device further includes a housing for accommodating the holder, a positioning shaft, a pushing seat including a magnetic element, a pressing element and a sensing unit. The positioning shaft, the pushing seat, the pressing element and the sensing unit are all accommodated within the housing. The holder is fixed on the pressing element. The pressing element is rotatably fixed on an end of the positioning shaft. The end of the positioning shaft is penetrated through the pushing seat and sustained against the pressing element. When an external force is exerted on the pushing seat through the sleeve, a distance between the pushing seat and the pressing element is changed, so that a change of a magnetic field of the magnetic element is received by the sensing unit.

In an embodiment, the control device further includes a control switch, which is disposed within the housing and disposed under a touching part of the pressing element. In response to a downward force exerted on the holder, the touching part is driven to press the control switch, so that the control switch is triggered to generate a signal.

In accordance with a third aspect of the present invention, there is provided a sleeve. The sleeve is disposed within a control device and contactable by a user for controlling a cursor motion of an electronic device. The control device includes a holder, the sleeve and a detecting module. The sleeve is disposed on the holder. At least one of a rotating action and a moving action of the sleeve is detectable by the detecting module. Furthermore, a touch-feel enhancing mechanism is formed on an outer surface of the sleeve. The touch-feel enhancing mechanism includes a plurality of unit structures which are not parallel with a longitudinal direction of the sleeve.

In an embodiment, the unit structures are convex structures or concave structures. The convex structures or the concave structures are not responsible for providing a function of being detected by the detecting module. Moreover, each of the convex structures or the concave structures has a geometric profile selected from at least one of a point shape, a block shape and a strip shape.

In an embodiment, the unit structures are convex structures or concave structures. The convex structures or the concave structures are not responsible for providing a function of being detected by the detecting module. Moreover, the convex structures or the concave structures are regularly or irregularly distributed on the outer surface.

In an embodiment, the unit structures are convex structures or concave structures. The convex structures or the concave structures are not responsible for providing a function of being detected by the detecting module. Moreover, the convex structures or the concave structures are continuously or discontinuously distributed on the outer surface.

In an embodiment, the sleeve is rotatable and/or movable on the holder. Alternatively, the sleeve is rotatable and/or movable relative to at least one portion of the holder.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

In this context, the term "holder" denotes a functional component for providing at least one of a function of guiding the sleeve and a function of supporting the sleeve. The holder may have various implementation examples. In the present invention, the holder which is served as a component of the control device may be an integral structure or a combination of several structures. With respect to the housing of the control device, in response to a downward force, at least one portion of the holder may be moved upwardly or downwardly or at least one portion of the holder does not be moved upwardly or downwardly. Under this circumstance, at least one portion of the holder may provide a length larger than a supporting surface of the sleeve along a longitudinal direction of the sleeve. The sleeve is supported by at least one portion of the supporting surface. Moreover, the sleeve is guided by at least one portion of the supporting surface, so that the sleeve is rotatable and/or movable relative to at least one portion of the holder. Optionally, if the holder is composed of several structures, in response to a downward force, a portion of the holder may be moved upwardly or downwardly or a portion of the holder does not be moved upwardly or downwardly. Another portion of the holder may be operated to perform at least one of a rotating action and a moving action. Under this circumstance, the sleeve may be attached on the holder. As the holder is rotated or moved, the sleeve correspondingly performs at least one of the rotating action and the moving action.

In this context, the term "sleeve" denotes various implementation examples of the sleeve made of a rubbery material. Hereinafter, the sleeve may be referred as a flexible sleeve or only referred as a sleeve. The flexible sleeve may be sheathed around the holder. A portion of the holder is served as the supporting surface. The geometric profile of the flexible sleeve may only roughly match the geometric profile of the holder. Consequently, the flexible sleeve is rotatable or movable relative to the holder. In accordance with another aspect, the sleeve may be sheathed around the holder. The geometric profile of the sleeve may closely match the geometric profile of the holder. In a case that the holder is not operated to perform at least one of a rotating action and a moving action, the sleeve is rotatable and/or movable relative to the holder. Alternatively, in a case that a portion of the holder is operated to perform at least one of a rotating action and a moving action, the sleeve may be attached on the holder. As the holder is rotated or moved, the sleeve correspondingly performs at least one of the rotating action and the moving action.

In this context, the term "touch-feel enhancing mechanism" is a mechanism for allowing the user to recognize different stimulation levels of skin during the control device is operated by the user. However, the user does not feel uncomfortable in response to the different stimulation levels for a long use time. Moreover, the material of the touch-feel enhancing mechanism may be identical to or different from the material of the sleeve or the flexible sleeve. In a case that the material of the touch-feel enhancing mechanism is identical to the material of the sleeve or the flexible sleeve, the touch-feel enhancing mechanism may be implemented by designing the geometric profiles thereof. It is noted that the above descriptions are presented herein for purpose of illustration and description only.

Figure 1:
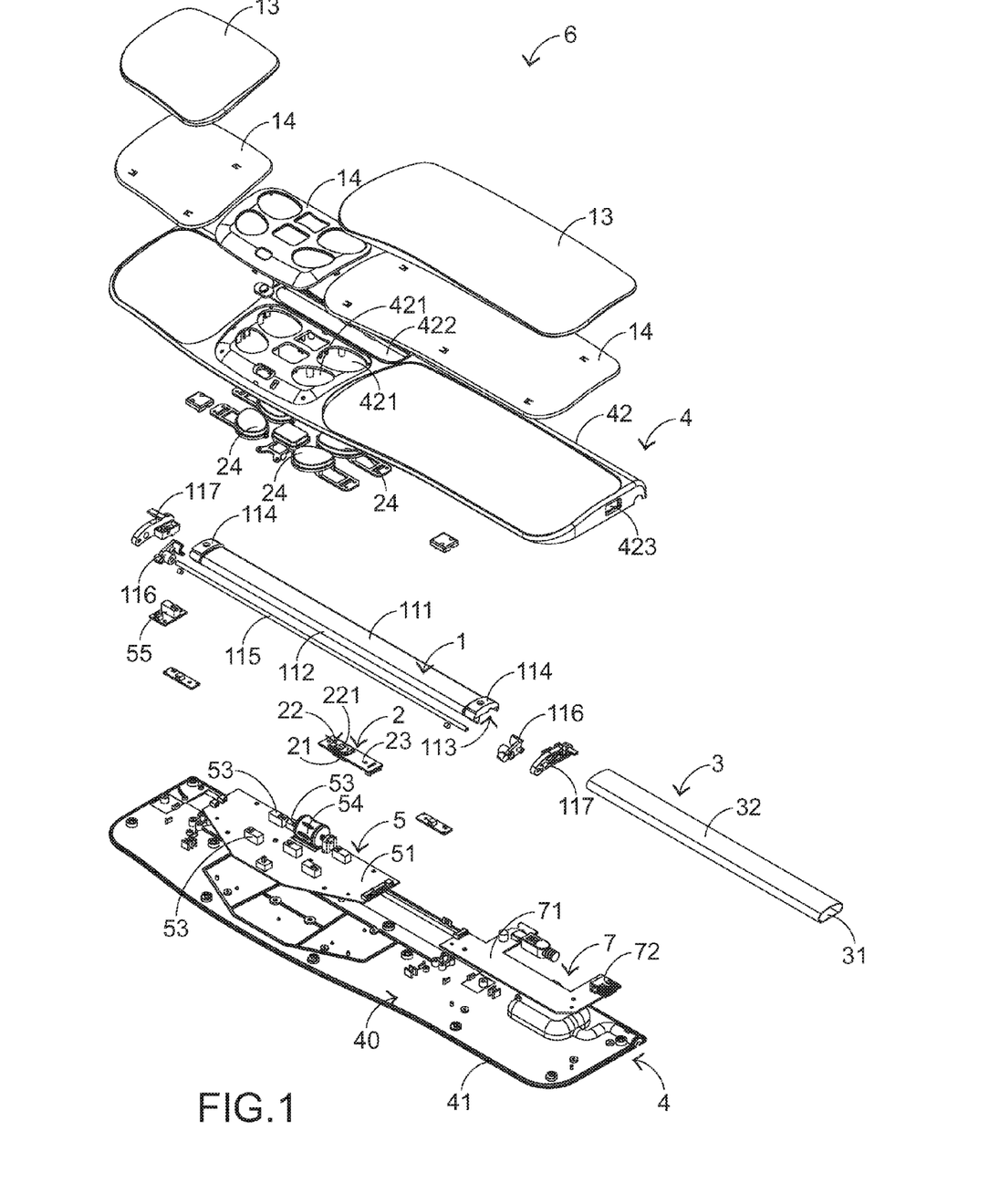
FIG. 1 is a schematic exploded view illustrating a control device according to a first embodiment of the present invention.

FIG. 1 is a schematic exploded view illustrating a control device according to a first embodiment of the present invention. As shown in FIG. 1, the control device 6 comprises a holder 1, a circuit module 2, a circuit module 5, a flexible sleeve 3, and a housing 4. In the first embodiment, the housing 4 comprises a bottom shell 41 and an upper cover 42. An operating space 40 is defined between the bottom shell 41 and the upper cover 42 for accommodating most components of the control device 6. For example, the holder 1, the circuit module 2, the circuit module 5, the flexible sleeve 3 and a plurality of control elements 24 are accommodated within the operating space 40.

A hollow part 421 and a slot 422 are formed in the upper cover 42. The control elements 24 and a control element 54 are disposed under the hollow part 421, and exposed to the hollow part 421. The flexible sleeve 3 is sheathed around the holder 1, and exposed to the slot 422. In addition, a wrist rest 13 and a plaque 14 are disposed on the upper cover 42. The wrist rest 13 is made of a soft material or an elastic material. The wrist rest 13 is a device used to support the wrist. Corresponding to the hollow part 421, the plaque 14 also has a plurality of apertures to expose the underlying control elements 24.

In addition, the holder 1 further comprises a first surface 111, a second surface 112, and an accommodation space 113. The first surface 111 is near a force-exerting position of the user. The second surface 112 is connected with the first surface 111. The accommodation space 113 faces the second surface 112. The flexible sleeve 3 with an axial hole may be sheathed around the first surface 111 of the holder 1. The length of the flexible sleeve 3 along the longitudinal axis is shorter than the length of the holder 1. Consequently, the flexible sleeve 3 is movable on the first surface 111 of the holder 1, and rotatable within the operating space 40 and relative to the first surface 111 of the holder 1. Furthermore, the circuit module 2 is accommodated within the accommodation space 113. The circuit module 2 comprises a circuit board 23, at least one detecting module 22, and a microprocessor 21. The at least one detecting module 22 and the microprocessor 21 are disposed on the circuit board 23. The detecting module 22 has a detecting surface 221 for detecting at least one of a rotating action and a moving action of the flexible sleeve 3, thereby generating a control signal to control a cursor motion of an electronic device.

Figure 2:
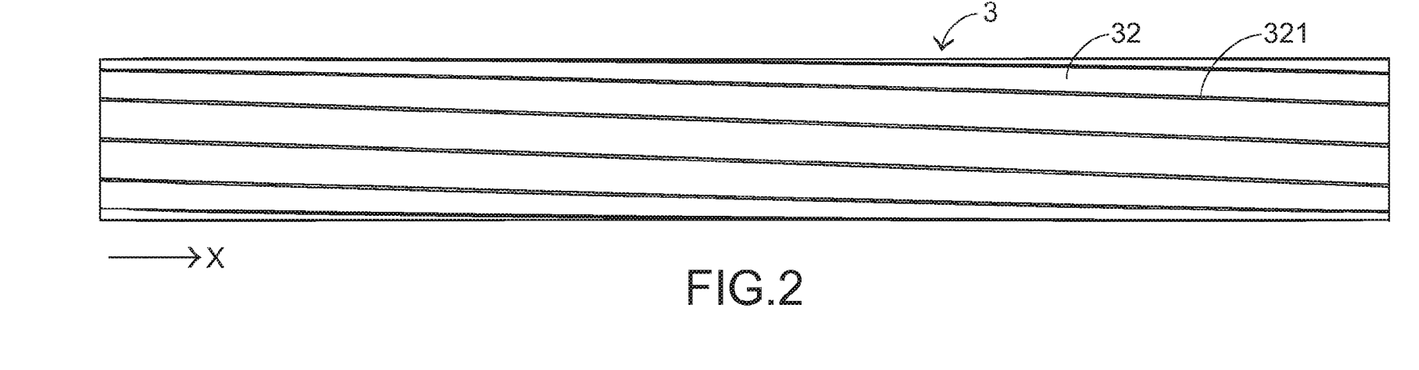
FIG. 2 is a schematic front view illustrating a first exemplary sleeve used in the control device of the present invention.
Figure 3:
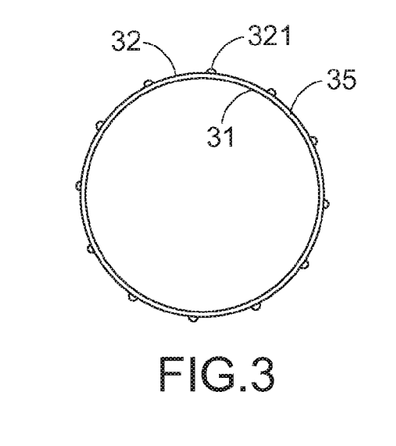
FIG. 3 is a schematic side view illustrating the first exemplary sleeve used in the control device of the present invention.

FIG. 2 is a schematic front view illustrating a first exemplary flexible sleeve used in the control device of the present invention. FIG. 3 is a schematic side view illustrating the first exemplary flexible sleeve used in the control device of the present invention. In the first exemplary flexible sleeve 3, a touch-feel enhancing mechanism is formed on an outer surface 32 of the flexible sleeve 3. The touch-feel enhancing mechanism has a plurality of unit structures 321. For example, in the first exemplary flexible sleeve 3, the unit structure 321 is a convex structure. The unit structure 321 is not responsible for providing the function of being detected by the detecting module 22. Whereas, the unit structure 321 is used for increasing the touch feel of operating the control device. Preferably, the height of the unit structure 321 protruded from the outer surface 32 of the flexible sleeve 3 is equal to or smaller than the thickness of a single supporting layer 35, which constitutes the main body of the flexible sleeve 3. Moreover, the height of the unit structure 321 protruded from the outer surface 32 of the flexible sleeve 3 should not be very high in order to prevent the uncomfortable feel of operating the control device. In this embodiment, the flexible sleeve 3 comprises a plurality of unit structures 321. These unit structures 321 are uniformly distributed or discretely arranged around the outer surface 32 of the flexible sleeve 3 at substantially regular intervals. In this embodiment, the unit structures 321 have strip-shaped geometric profiles. The strip-shaped unit structures 321 are not parallel with a longitudinal direction X of the flexible sleeve 3. That is, these unit structures 321 are arranged around the outer surface 32 at an inclined angle relative to the longitudinal direction X of the flexible sleeve 3.

Figure 4:
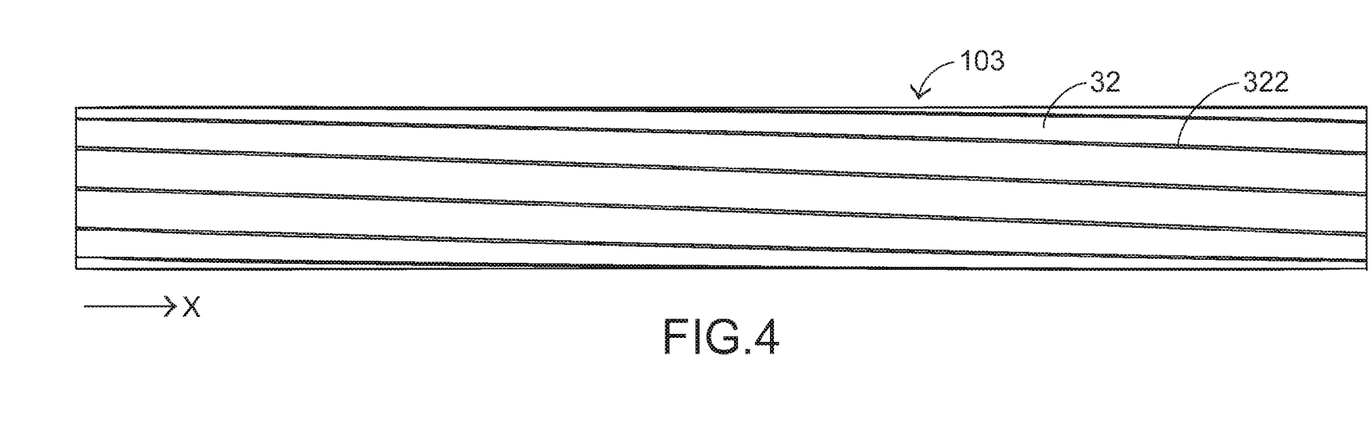
FIG. 4 is a schematic front view illustrating a second exemplary sleeve used in the control device of the present invention.
Figure 5:
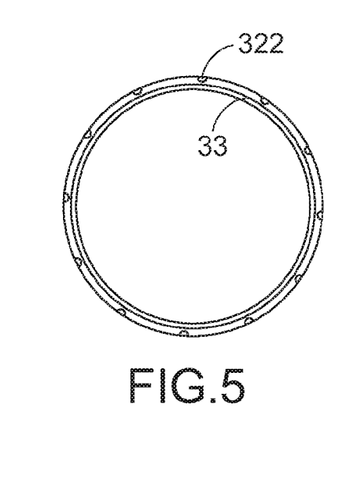
FIG. 5 is a schematic side view illustrating the second exemplary sleeve used in the control device of the present invention.

The unit structures are not restricted to the convex structures. FIG. 4 is a schematic front view illustrating a second exemplary sleeve used in the control device of the present invention. FIG. 5 is a schematic side view illustrating the second exemplary sleeve used in the control device of the present invention. In the second exemplary sleeve 103 (or flexible sleeve), a concave structure is served as a unit structure 322. The sleeve 103 is constituted by a composite supporting layer including a reinforcing layer 33. The reinforcing layer 33 is used for providing the inner surface 31 and optimizing the inner surface 31. Consequently, the rotating signal or the moving signal generated by the sleeve 103 can be sensitively and actually responded to and received by the detecting module. In addition, the unit structures 322 are formed on the outer surface 32 of the sleeve 103. Alternatively, in the sleeve 103 constituted by the composite supporting layer, the outer surface 32 is provided by the reinforcing layer 33, and the unit structures 322 (e.g. concave structures) are formed on the reinforcing layer 33. Alternatively, if the sleeve 103 is constituted by a single supporting layer, concave structures may be served as the unit structures 322 as long as the controlling function of the sleeve 103 and the function of the sleeve 103 to be detected are not largely influenced by the concave structures.

From the above discussions, the convex structures or the concave structures of the touch-feel enhancing mechanism may be constituted by a single supporting layer of the sleeve, or constituted by at least one portion of a composite supporting layer of the sleeve. Alternatively, the touch-feel enhancing mechanism may comprise a friction enhancing structure with a friction coefficient identical to the reinforcing layer in order to strengthen the frequently touched touch-feel enhancing mechanism. The reinforcing layer may be applied to the touch-feel enhancing mechanism and the outer surface as long as the function of increasing the touch feel by the touch-feel enhancing mechanism is not adversely affected. Moreover, if the enhanced touch feel is achieved by the friction force, the touch-feel enhancing mechanism may comprise a friction enhancing structure with a friction coefficient higher than the outer surface of the sleeve.

Figure 6:
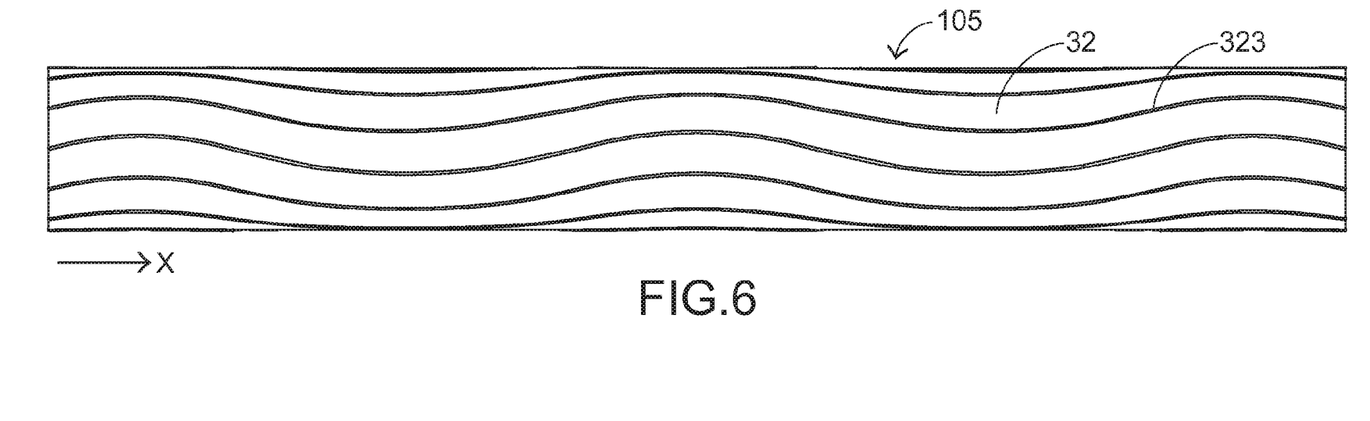
FIG. 6 is a schematic front view illustrating a third exemplary sleeve used in the control device of the present invention.
Figure 7:
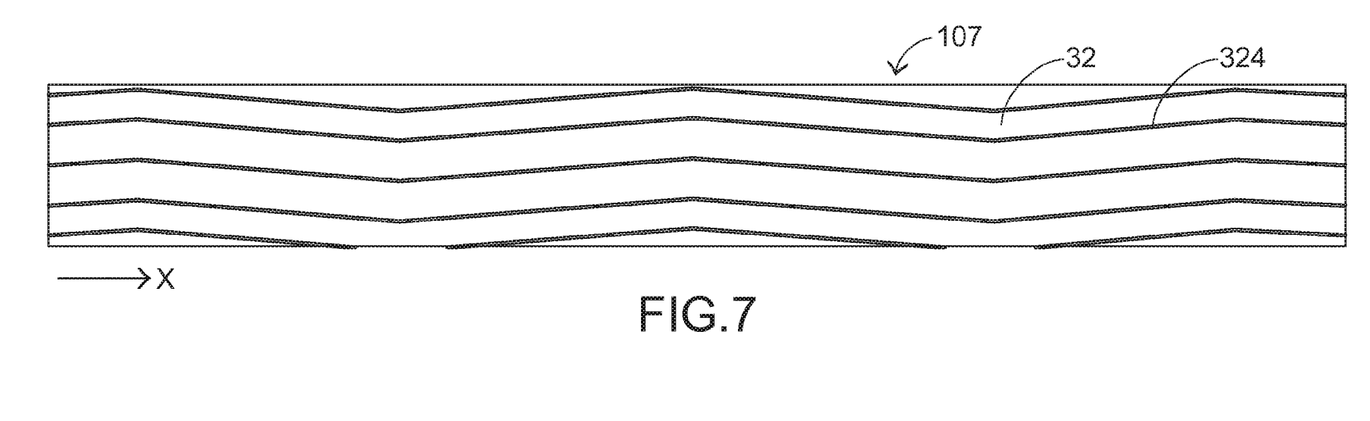
FIG. 7 is a schematic front view illustrating a fourth exemplary sleeve used in the control device of the present invention.
Figure 8:
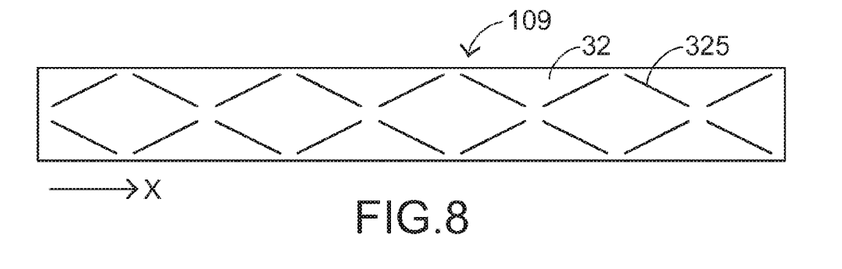
FIG. 8 is a schematic front view illustrating a fifth exemplary sleeve used in the control device of the present invention.

FIG. 6 is a schematic front view illustrating a third exemplary sleeve used in the control device of the present invention. FIG. 7 is a schematic front view illustrating a fourth exemplary sleeve used in the control device of the present invention. In the second exemplary sleeve as shown in FIG. 2, the unit structures 321 have linear strip-shaped geometric profiles. On the other hands, as shown in FIG. 6, the unit structures 323 of the sleeve 105 have curvy strip-shaped geometric profiles. Moreover, as shown in FIG. 7, the unit structures 324 of the sleeve 107 have saw-toothed or spiral strip-shaped geometric profiles. In this context, the strip-shaped geometric profile indicates that the length of the unit structure along a specified direction is much longer than the length of the unit structure along any other direction. The length of the unit structure along the specified direction may be greater than, smaller than or equal to the length of the sleeve along the longitudinal direction of the sleeve. In other words, some of the unit structures 323 of the touch-feel enhancing mechanism of the third exemplary sleeve 105 are continuously distributed on the outer surface 32 of the sleeve 105; and the unit structures 324 of the touch-feel enhancing mechanism of the fourth exemplary sleeve 107 are continuously distributed on the outer surface 32 of the sleeve 107. FIG. 8 is a schematic front view illustrating a fifth exemplary sleeve used in the control device of the present invention. As shown in FIG. 8, the unit structures 325 are discontinuously distributed on the outer surface 32 of the sleeve 109.

Figure 9:
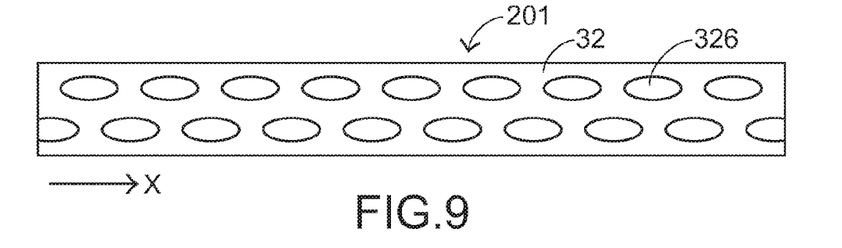
FIG. 9 is a schematic front view illustrating a sixth exemplary sleeve used in the control device of the present invention.
Figure 10:
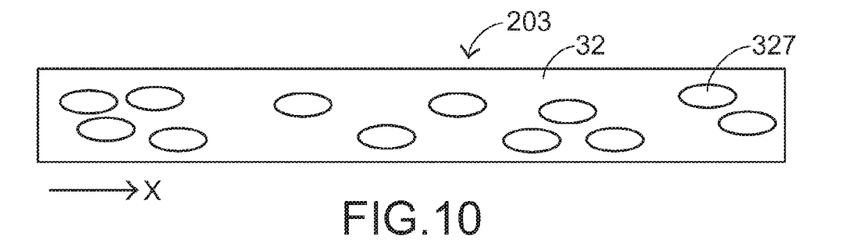
FIG. 10 is a schematic front view illustrating a seventh exemplary sleeve used in the control device of the present invention.

In addition to the strip-shaped geometric profiles, the unit structures 325 of the touch-feel enhancing mechanism of the sleeve 109 may have other geometric profiles. For example, the lengths of the unit structure along a first direction and a second direction are substantially identical, but much longer than the length of the unit structure along a third direction. Moreover, as shown in FIG. 9, the unit structure 326 of the sleeve 201 has a block shape such as a circular shape, an elliptic shape, an irregular polygonal shape or a regular polygonal shape. The length of the unit structure 326 on the outer surface 32 is much larger than the height of convex structure or the depth of the concave structure with respect to the outer surface 32. In a case that the touch-feel enhancing mechanism comprises a plurality of unit structures 326 distributed on the outer surface 32 of the sleeve 201, these unit structures 326 are not responsible for providing the function of being detected by the detecting module. Consequently, these unit structures 326 may be regularly distributed on the outer surface 32 of the sleeve 201. Alternatively, as shown in FIG. 10, the unit structures 327 may be irregularly distributed on the outer surface 32 of the sleeve 203.

Figure 11:
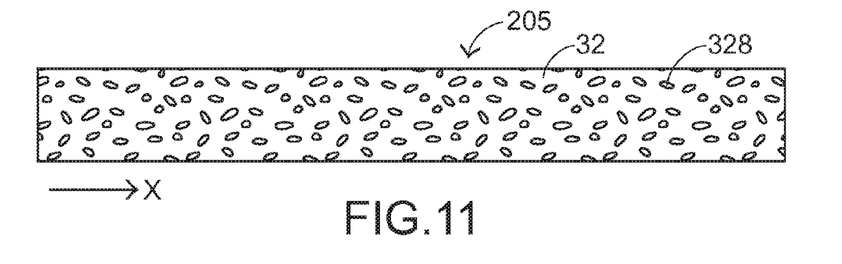
FIG. 11 is a schematic front view illustrating an eighth exemplary sleeve used in the control device of the present invention.

FIG. 11 is a schematic front view illustrating an eighth exemplary sleeve used in the control device of the present invention. In the eighth exemplary sleeve 205, the lengths of the unit structure 328 along all direction are substantially identical. That is, the unit structure 328 has a point shape. The length of the unit structure 328 on the outer surface 32 of the sleeve 205 is substantially equal to the height of convex structure or the depth of the concave structure with respect to the outer surface 32. It is noted that these unit structures 328 may be continuously or discontinuously distributed on the outer surface 32 of the sleeve 205, or regularly or irregularly distributed on the outer surface 32 of the sleeve 205.

Figure 12:
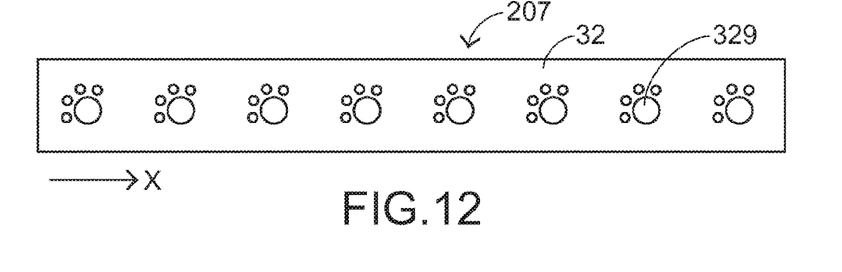
FIG. 12 is a schematic front view illustrating a ninth exemplary sleeve used in the control device of the present invention.

The unit structures with various geometric profiles may be collocated with each other in order to enhance the touch feel during operation and increase amusement. FIG. 12 is a schematic front view illustrating a ninth exemplary sleeve used in the control device of the present invention. As shown in FIG. 12, the unit structure 329 of the ninth exemplary sleeve 207 has a geometric profile composed of point and block shapes. The unit structures 329 are distributed on the outer surface 32 of the sleeve 207. Of course, various unit structures composed of convex structures and concave structures may be used to constitute the touch-feel enhancing mechanism of the present invention.

Furthermore, the above exemplary sleeves may be made of a rubbery material. The geometric profile of the flexible sleeve may roughly or closely match at least one portion of the holder. Moreover, the inner surface 31 of the sleeve may be equipped with a plurality of indentations, bumps, embossed structures or dots, and coated with a layer of silver powder or silver paint. Please refer to FIG. 1 again. When the detecting surface 221 of the detecting module 22 is located to face the inner surface 31, the indentations, the bumps, the embossed structures or the dots are only provided to allow the detecting module 22 to clearly identify and detect the rotating action or moving action of the flexible sleeve 3 while increasing the overall sensitivity and resolution and precisely positioning and well operating the cursor. The above descriptions are presented herein for purpose of illustration and description only. It is noted that numerous modifications and alterations may be made while retaining the teachings of the invention.

Figure 13:
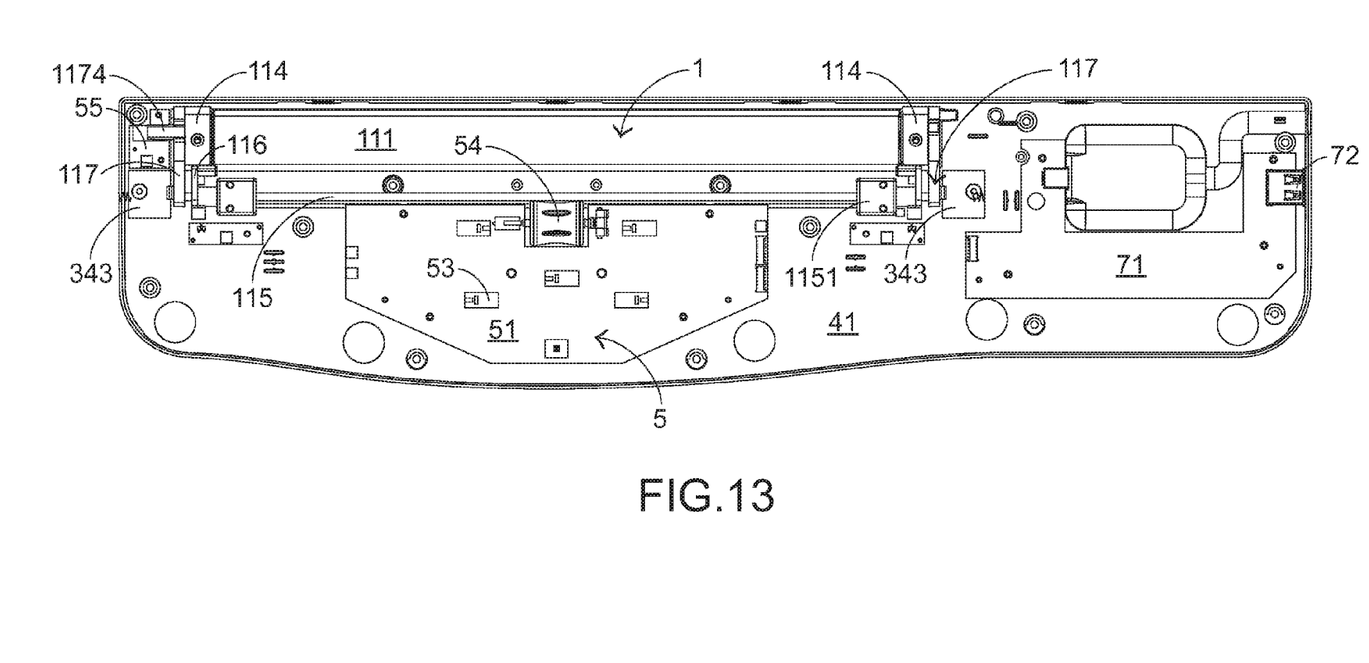
FIG. 13 is a schematic top view illustrating the bottom shell of the control device according to the first embodiment of the present invention.

FIG. 13 is a schematic top view illustrating the bottom shell 41 of the control device according to the first embodiment of the present invention. Please refer to FIGS. 1 and 13. In the first embodiment, most components of the control device 6 are accommodated within the operating space 40, and fixed on the bottom shell 41. In the first embodiment, the circuit module 5 comprises a circuit board 51, a plurality of control switches 53, and a control element 54. The circuit board 51 is fixed on the bottom shell 41. The control switches 53 and the control element 54 are disposed on the circuit board 51. Some of the control switches 53 are aligned with corresponding control elements 24 that are disposed over the control switches 53. The control element 24 may be a key, a wheel, a scrolling ball or any other operable element by a user's hand. The function of controlling a mouse cursor is achievable by simply pressing or rotating the control element 24 to trigger a corresponding control switch 53 of the circuit module 5. The example of the control element 24 is presented herein for purpose of illustration and description only. It is noted that numerous modifications and alterations may be made while retaining the teachings of the invention.

Moreover, a circuit module 7 is further accommodated within the operating space 40, and fixed on the bottom shell 41. The circuit module 7 comprises a circuit board 71 and a transmission interface 72. The transmission interface 72 is located at a side of the circuit board 71. Moreover, a perforation 423 is formed in a lateral rim of the upper cover 42 for allowing the transmission interface 72 to penetrate through. In this embodiment, the circuit module 5 and the circuit module 7 are disposed on separate and independent circuit boards. Alternatively, the circuit module 5 and the circuit module 7 may be integrated into a single circuit board. Other circuit modules which will be described as follows may be integrated into the above circuit module or may be independent circuit modules. For designing the independent circuit modules, the independent circuit modules may be in communication with each other or in communication with an external electronic device through wires (or transmission lines) and the connecting interface, or the independent circuit modules may separately transmit and receive signals.

Figure 14:
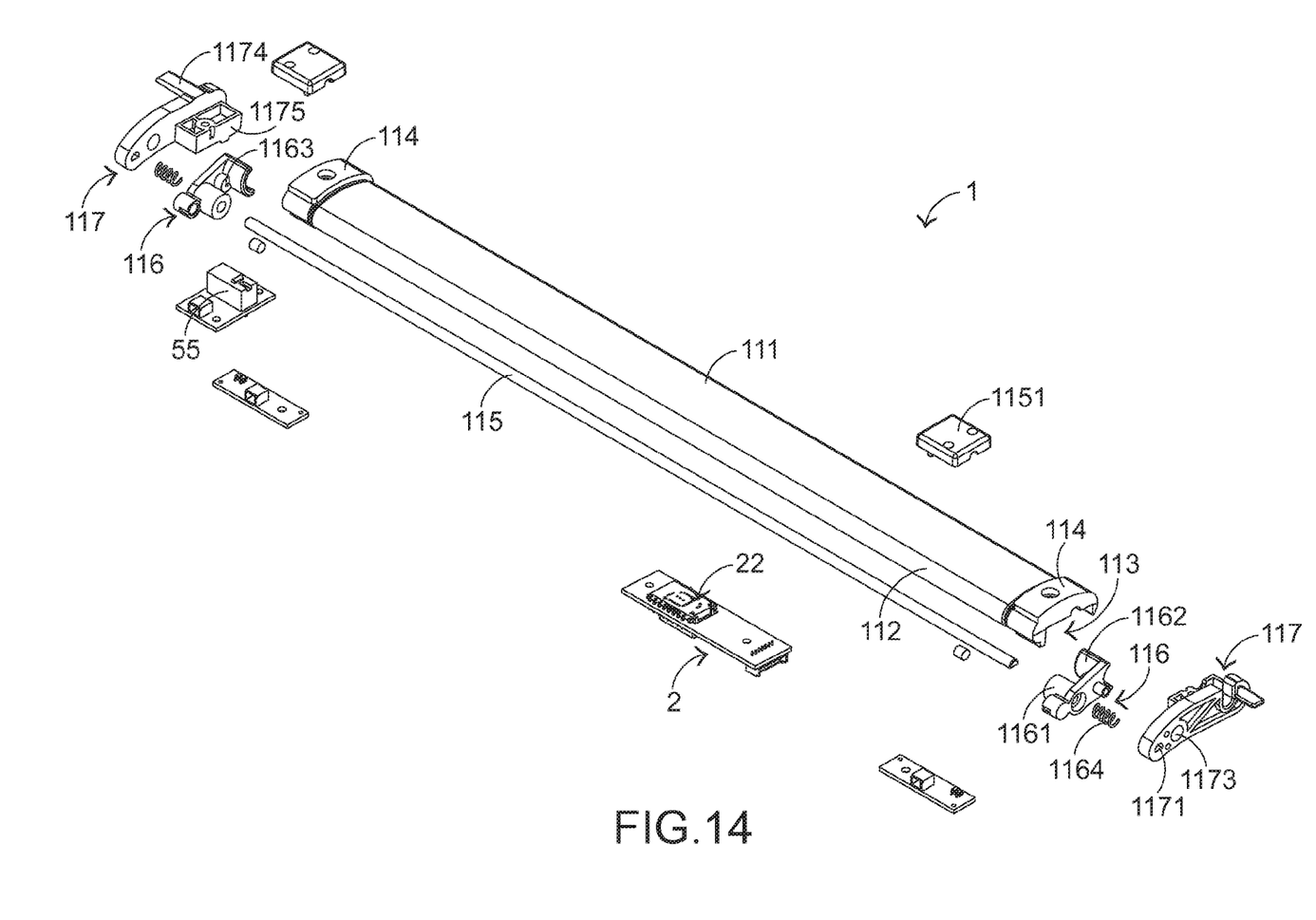
FIG. 14 is a schematic exploded view illustrating some components of a control module of the control device according to the first embodiment of the present invention.

FIG. 14 is a schematic exploded view illustrating some components of a control module of the control device according to the first embodiment of the present invention. Please refer to FIGS. 1, 13 and 14. The holder 1 is accommodated within the operating space 40, and located at a front side of the circuit module 5. In addition, the holder 1 is aligned with the slot 422 of the upper cover 42. Two docking parts 114 are located at both ends of the stick-like holder 1, respectively. Moreover, a positioning module comprises a positioning shaft 115. The positioning shaft 115 is arranged between the holder 1 and the circuit module 5. Each of the both ends of the positioning shaft 115 is penetrated through a corresponding pushing seat 116 and a corresponding pressing element 117. In particular, after each end of the positioning shaft 115 is sequentially penetrated through a pivotal hole 1161 of the corresponding pushing seat 116 and a corresponding elastic element 1164, the end of the positioning shaft 115 is inserted into a pivotal hole 1171 of the corresponding pressing element 117. In the first embodiment, the positioning shaft 115 is directly fixed on the bottom shell 41 through a fixing part 1151 of the positioning module. Alternatively, the positioning shaft 115 is fixed on the bottom shell 41 through any other fixing part (not shown). The way of fixing the positioning shaft 115 is presented herein for purpose of illustration and description only.

The pushing seat 116 further comprises a sustaining part 1162 and a sheathing part 1163. The sheathing part 1163 is arranged between the sustaining part 1162 and the pivotal hole 1161. A magnetic element (not shown) is disposed within the sheathing part 1163. Moreover, a sensing unit 343 is fixed on the bottom shell 41, and located beside the magnetic element that is disposed within the sheathing part 1163. Consequently, the magnetic element within the sheathing part 1163 can be sensed by the sensing unit 343. Moreover, the sheathing part 1163 of the pushing seat 116 is sheathed around the pivotal hole 1173 of the pressing element 117. The pushing seat 116 is movable along the pivotal hole 1173. In addition, the pushing seat 116 is movable on the positioning shaft 115. In a case that an external force is exerted on the sustaining part 1162 of the pushing seat 116 along a longitudinal direction of the positioning shaft 115, the pushing seat 116 is moved toward the pressing element 117. At the same time, the relative distance between the magnetic element and the sensing unit 343 is changed, and the elastic element 1164 on the positioning shaft 115 is compressed. Moreover, due to the elastic potential energy of the compressed elastic element 1164, the pushing seat 116 is returned to the original position where no external force is exerted on the pushing seat 116.

Moreover, the pressing element 117 further comprises a touching part 1174 and a docking part 1175. The touching part 1174 and the docking part 1175 are located at the positions corresponding to the holder 1. The docking part 1175 of the pressing element 117 and the corresponding docking part 114 of the holder 1 are coupled with each other, and the docking part 114 is contacted with the pressing element 117. A control switch 55 is disposed under the touching part 1174. The pressing element 117 is rotatable relative to the positioning shaft 115. When a downward force is exerted on the holder 1, the pressing element 117 is driven to rotate. Consequently, the touching part 1174 is moved for a specified traveling distance to press the control switch 55. At the moment when the control switch 55 is pressed by the touching part 1174, a triggering signal is generated. After the downward force is eliminated, the touching part 1174 is returned to the original position where the touching part 1174 is only in contact with the control switch 55.

Moreover, in the first embodiment, the second surface 112 of the holder 1 is bent as the sidewall and the inner surface of the holder 1. The second surface 112 faces the accommodation space 113. The holder 1 may have a flat, arc-shaped, circular or elliptical cross section. Alternatively, the holder 1 may have any shape for facilitating the rotating action and the moving action of the sleeve 3. In other words, the first surface is a flat surface or an arc-shaped surface. Furthermore, the holder 1 is made of polyoxymethylene (POM), polytetrafluoroethylene (PTFE, also referred as Teflon), ultra high molecular weight polyethylene (UHMWPE) or any suitable self-lubricating material. Optionally, the holder 1 may be made of any other suitable material such as a steel material or a plastic material with few parting lines or no parting lines as long as the sleeve 3 can be rotated or moved on the holder 1.

Moreover, in the first embodiment, the detecting module 22 is accommodated within the accommodation space 113. If the first surface 111 and the second surface 112 of the holder 1 are opaque, the detecting surface 221 of the detecting module 22 will directly detect the inner surface 31 of the sleeve 3. That is, the first surface 111 and the second surface 112 of the holder 1 are not arranged between the detecting surface 221 of the detecting module 22 and the inner surface 31 of the sleeve 3. Consequently, the detecting surface 221 of the detecting module 22 is located beside the inner surface 31 of the sleeve 3.

Figure 15:
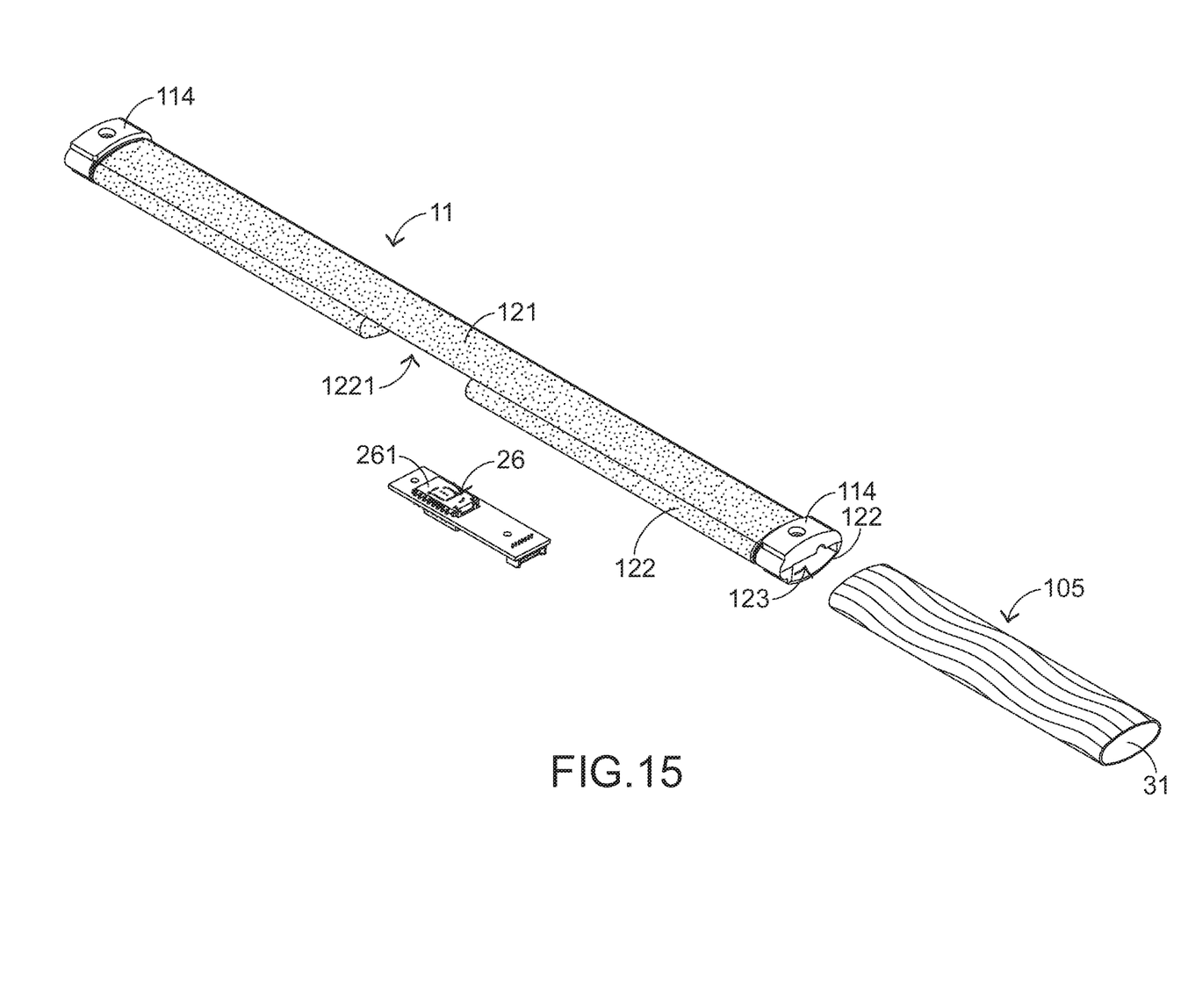
FIG. 15 is a schematic exploded view illustrating some components of a control device according to a second embodiment of the present invention.

It is noted that the second surface 112 connected with the first surface 111 is not restricted to the specified profile of the first embodiment. FIG. 15 is a schematic exploded view illustrating some components of a control device according to a second embodiment of the present invention. In a case that the holder 11 has an elliptic or circular cross section, the first surface 121 still faces upwardly. The second surface 122 is connected with the first surface 121 and has an elliptic profile. Meanwhile, the accommodation space 123 faces the second surface 122, and is enclosed by the first surface 121 and the second surface 122. Under this circumstance, if the user wants to accommodate the detecting module 26 within the accommodation space 123 for detecting at least one of a rotating action and a moving action of the sleeve 105, the detecting surface 261 of the detecting module 26 should face the inner surface 31 of the sleeve 105 and can detect the rotating action and the moving action of the sleeve 105. In a case that the detecting module 26 is an optical sensor, the first surface 121 of the holder 11 is opaque, and the second surface 122 of the holder 11 has a vacant zone 1221. Under this circumstance, the detecting surface 261 of the detecting module 26 faces the vacant zone 1221 of the second surface 122 of the holder 11 and the inner surface 31 of the sleeve 105.

Consequently, the detecting signal may be transmitted to or reflected by the inner surface 31 of the sleeve 105 through the vacant zone 1221. It is noted that the vacant zone 1221 of the second surface 122 of the holder 11 may be located at any suitable position of the second surface 122 as long as the rotating action or the moving action of the sleeve 105 can be detected by the detecting module 26. Furthermore, the vacant zone 1221 of the second surface 122 may be replaced by a transparent structure. That is, the second surface 122 of the holder 11 is made of a transparent material and an opaque material. Alternatively, the second surface 122 of the holder 11 is produced by fixing a transparent structure on an opaque structure. Alternatively, the second surface 122 of the holder 11 is produced by combining a transparent structure and an opaque structure together.

Figure 16:
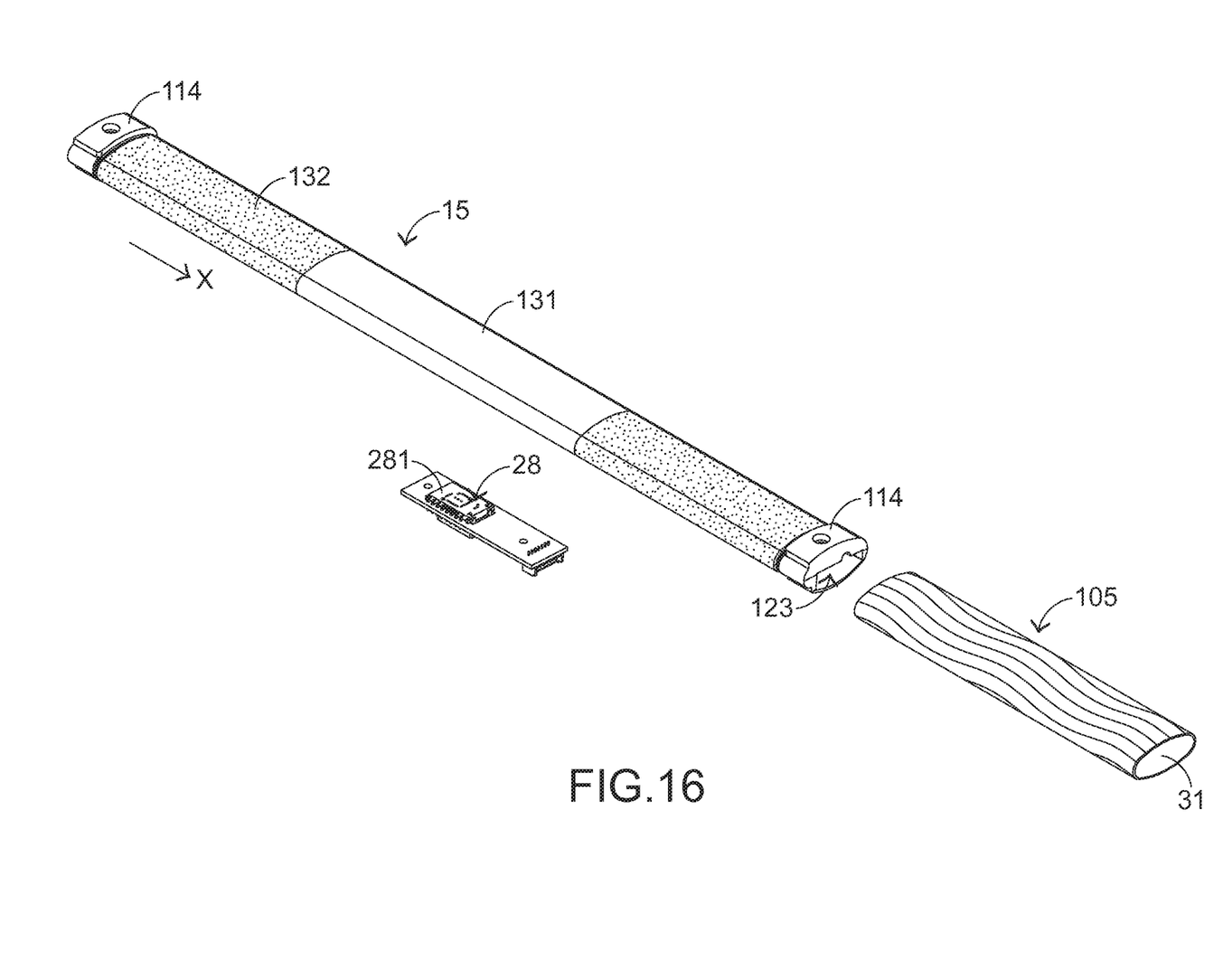
FIG. 16 is a schematic exploded view illustrating some components of a control device according to a third embodiment of the present invention.

In a case that the holder may comprise two structures made of two different materials, these two structures may be combined together or integrally formed in a suitable manner. Consequently, a portion of the holder is transparent. FIG. 16 is a schematic exploded view illustrating some components of a control device according to a third embodiment of the present invention. As shown in FIG. 16, the holder 15 comprises a transparent structure 131 and a non-transparent structure 132. The transparent structure 131 and the non-transparent structure 132 are combined together or integrally formed. In this embodiment, the transparent structure 131 is used as a portion of the first surface and a portion of the second surface as long as the length of the transparent structure 131 along the longitudinal direction X of the sleeve is smaller than the length of the sleeve. In other words, if at least one of the first surface and the second surface comprises a transparent structure, a detecting surface 281 of the detecting module 28 faces the transparent structure 131 and the inner surface 31 of the flexible sleeve 105.

Figure 17:
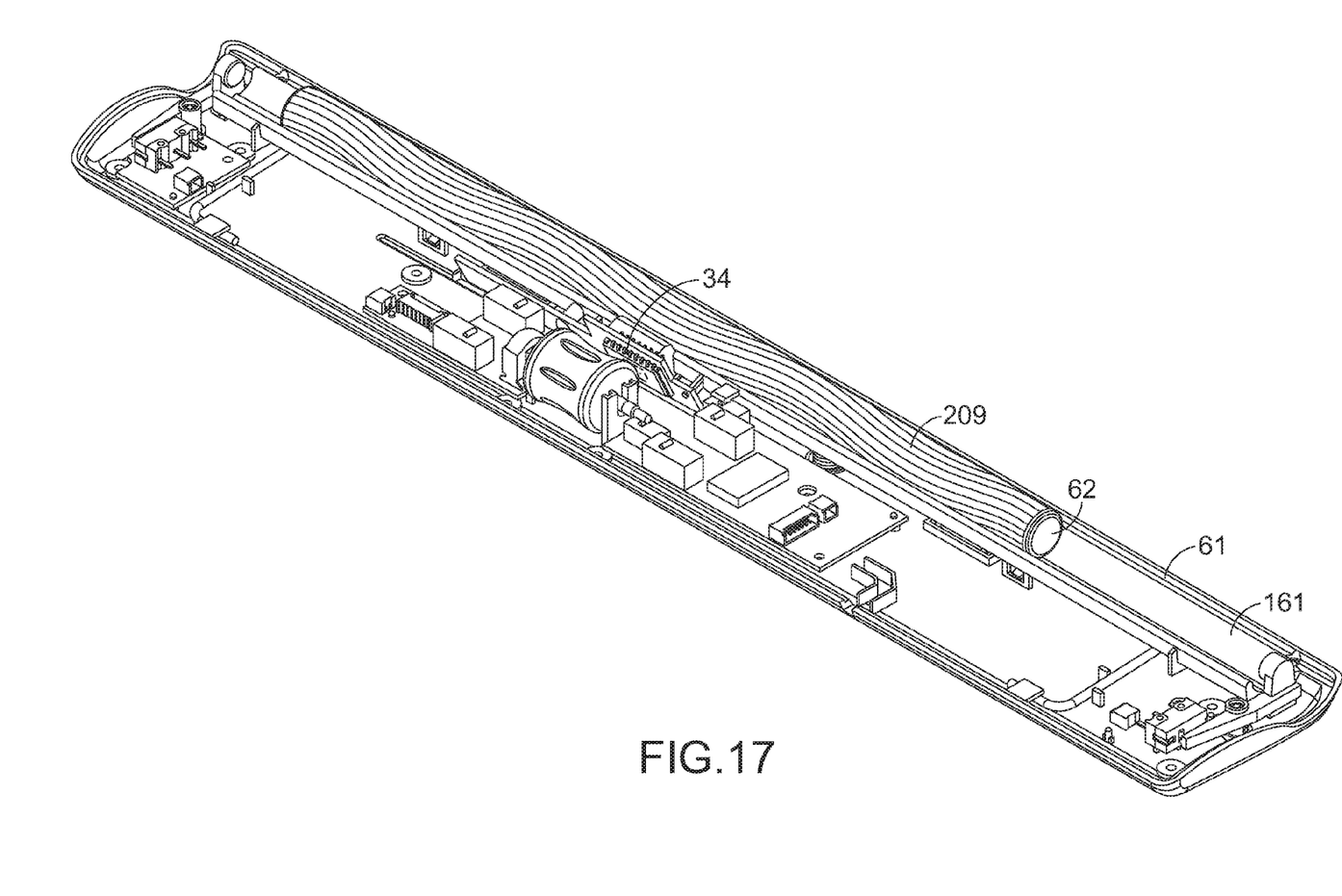
FIG. 17 is a schematic perspective view illustrating a control device according to a fourth embodiment of the present invention.

FIG. 17 is a schematic perspective view illustrating a control device according to a fourth embodiment of the present invention. In the fourth embodiment, the holder comprises a supporting seat 61 with a track 161 and a roller 62. The supporting seat 61 with the track 161 is moved upwardly or downwardly only in response to a downward force. The length of the roller 62 is smaller than the track 161. In addition, the roller 62 is rotatable and/or movable within the track 161. The sleeve 209 is closely sheathed around the roller 62, and rotatable and/or movable relative to the roller 62. In the fourth embodiment, the roller 62 is a solid roller, the detecting module 34 is disposed beside the supporting seat 61 for detecting at least one of a rotating action and a moving action of the sleeve 105 and the roller 62, and the detecting function of the detecting module 34 is not adversely affected by the touch-feel enhancing mechanism on the outer surface of the sleeve 209.

Figure 18:
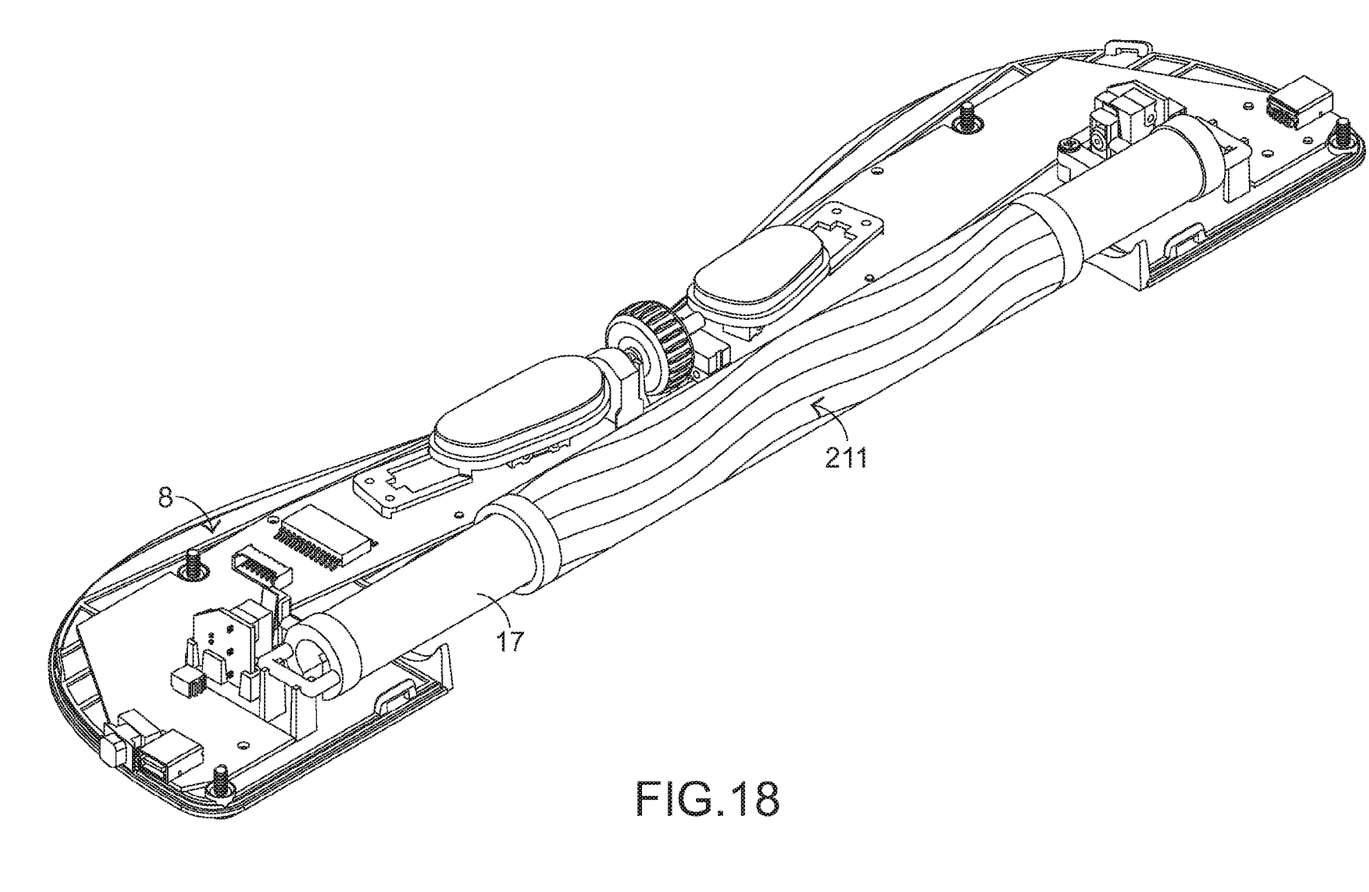
FIG. 18 is a schematic perspective view illustrating a control device according to a fifth embodiment of the present invention.

FIG. 18 is a schematic perspective view illustrating a control device according to a fifth embodiment of the present invention. In the fifth embodiment, the holder 17 is fixed on the housing 8. Moreover, in response to a downward force, the holder 17 is not moved upwardly or downwardly. Although the sleeve 211 is non-closely sheathed around the holder 17, the sleeve 211 is rotatable and/or movable relative to the fixed holder 17.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A control device for controlling a cursor motion of an electronic device, said control device comprising: a holder having an accommodation space therein; a flexible sleeve sheathed around said holder, and rotatable and movable on said holder, wherein a touch-feel enhancing mechanism is formed on an outer surface of said flexible sleeve; a detecting module for detecting at least one of a rotating action and a moving action of said flexible sleeve, thereby generating a control signal to control said cursor motion of said electronic device; and wherein said control device further comprises a housing for accommodating said holder, a positioning shaft, a pushing seat including a magnetic element, a pressing element and a sensing unit, wherein said positioning shaft, said pushing seat, said pressing element and said sensing unit are all accommodated within said housing, wherein said holder is fixed on said pressing element, said pressing element is rotatably fixed on an end of said positioning shaft, and said end of said positioning shaft is penetrated through said pushing seat and sustained against said pressing element, wherein when an external force is exerted on said pushing seat through said flexible sleeve, a distance between said pushing seat and said pressing element is changed, so that a change of a magnetic field of said magnetic element is received by said sensing unit.

2. The control device according to claim 1, wherein said touch-feel enhancing mechanism includes a convex structure or a concave structure as a unit structure, wherein said unit structure is not responsible for providing a function of being detected by said detecting module, wherein said unit structure has a geometric profile selected from at least one of a point shape, a block shape and a strip shape which is not parallel with a longitudinal direction of said flexible sleeve.

3. The control device according to claim 1, wherein said touch-feel enhancing mechanism includes a convex structure or a concave structure as a unit structure, wherein when said touch-feel enhancing mechanism comprises a plurality of unit structures, said unit structures are not responsible for providing a function of being detected by said detecting module, and said unit structures are regularly or irregularly distributed on said outer surface.

4. The control device according to claim 1, wherein said touch-feel enhancing mechanism includes a convex structure or a concave structure as a unit structure, wherein when said touch-feel enhancing mechanism comprises a plurality of unit structures, said unit structures are not responsible for providing a function of being detected by said detecting module, and said unit structures are continuously or discontinuously distributed on said outer surface.

5. The control device according to claim 1, wherein said flexible sleeve is constituted by a single supporting layer or a composite supporting layer, wherein said composite supporting layer further comprises a reinforcing layer.

6. The control device according to claim 1, wherein said detecting module is accommodated within said accommodation space, or wherein said control device further comprises a microprocessor, and said microprocessor and said detecting module are disposed within said accommodation space.

7. The control device according to claim 1, wherein said holder further comprises a first surface near a force-exerting position of an user and a second surface connected with said first surface and facing said accommodation space, wherein if at least one of said first surface and said second surface comprises a transparent structure, a detecting surface of said detecting module faces said transparent structure and an inner surface of said flexible sleeve which is opposed to said outer surface; or wherein if said second surface comprises a vacant zone, a detecting surface of said detecting module faces said vacant zone and an inner surface of said flexible sleeve which is opposed to said outer surface; or wherein said detecting module has a detecting surface and said flexible sleeve has an inner surface opposed to said outer surface, and said first surface or said second surface is not arranged between said detecting surface and said inner surface, so that said detecting surface is located beside said inner surface.

8. The control device according to claim 1, wherein said control device further comprises a control switch, which is disposed within said housing and disposed under a touching part of said pressing element, wherein in response to a downward force exerted on said holder, said touching part is driven to press said control switch, so that said control switch is triggered to generate a signal.

9. A control device for controlling a cursor motion of an electronic device, said control device comprising: a holder; a sleeve disposed on said holder, and rotatable and movable on said holder; and a detecting module for detecting a rotating action and a moving action of said sleeve, wherein a touch-feel enhancing mechanism is formed on an outer surface of said sleeve, and said touch-feel enhancing mechanism comprises a plurality of unit structures which are not parallel with a longitudinal direction of said sleeve; and wherein said control device further comprises a housing for accommodating said holder, a positioning shaft, a pushing seat including a magnetic element, a pressing element and a sensing unit, wherein said positioning shaft, said pushing seat, said pressing element and said sensing unit are all accommodated within said housing, wherein said holder is fixed on said pressing element, said pressing element is rotatably fixed on an end of said positioning shaft, and said end of said positioning shaft is penetrated through said pushing seat and sustained against said pressing element, wherein when an external force is exerted on said pushing seat through said flexible sleeve, a distance between said pushing seat and said pressing element is changed, so that a change of a magnetic field of said magnetic element is received by said sensing unit.

10. The control device according to claim 9, wherein said unit structures are convex structures or concave structures, wherein said convex structures or said concave structures are not responsible for providing a function of being detected by said detecting module, wherein each of said convex structures or said concave structures has a geometric profile selected from at least one of a point shape, a block shape and a strip shape.

11. The control device according to claim 9, wherein said unit structures are convex structures or concave structures, wherein said convex structures or said concave structures are not responsible for providing a function of being detected by said detecting module, wherein said convex structures or said concave structures are regularly or irregularly distributed on said outer surface.

12. The control device according to claim 9, wherein said unit structures are convex structures or concave structures, wherein said convex structures or said concave structures are not responsible for providing a function of being detected by said detecting module, wherein said convex structures or said concave structures are continuously or discontinuously distributed on said outer surface.

13. The control device according to claim 9, wherein said sleeve is rotatable and/or movable on said holder, or said sleeve is rotatable and/or movable relative to at least one portion of said holder.

14. The control device according to claim 9, wherein said sleeve is constituted by a single supporting layer or a composite supporting layer, wherein said composite supporting layer further comprises a reinforcing layer.

15. The control device according to claim 14, wherein said touch-feel enhancing mechanism is constituted by said single supporting layer, or constituted by at least one portion of said composite supporting layer, or constituted by a friction enhancing structure with a friction coefficient identical to said reinforcing layer.

16. The control device according to claim 9, wherein said holder comprises a first surface, a second surface and an accommodation space, wherein said first surface is near a force-exerting position of an user, said second surface is connected with said first surface, and said accommodation space faces said second surface, wherein said detecting module is accommodated within said accommodation space.

17. The control device according to claim 16, wherein if at least one of said first surface and said second surface comprises a transparent structure, a detecting surface of said detecting module faces said transparent structure and an inner surface of said sleeve which is opposed to said outer surface; or wherein if said second surface comprises a vacant zone, a detecting surface of said detecting module faces said vacant zone and an inner surface of said sleeve which is opposed to said outer surface; or wherein said detecting module has a detecting surface and said sleeve has an inner surface opposed to said outer surface, and said first surface or said second surface is not arranged between said detecting surface and said inner surface, so that said detecting surface is located beside said inner surface.

18. The control device according to claim 9, wherein said control device further comprises a control switch, which is disposed within said housing and disposed under a touching part of said pressing element, wherein in response to a downward force exerted on said holder, said touching part is driven to press said control switch, so that said control switch is triggered to generate a signal.

19. A sleeve disposed within a control device and contactable by a user for controlling a cursor motion of an electronic device, said control device comprising a holder, said sleeve and a detecting module, wherein said sleeve is disposed on said holder, and at least one of a rotating action and a moving action of said sleeve is detectable by said detecting module, wherein a touch-feel enhancing mechanism is formed on an outer surface of said sleeve, and said touch-feel enhancing mechanism comprises a plurality of unit structures which are not parallel with a longitudinal direction of said sleeve; and wherein said control device further comprises a housing for accommodating said holder, a positioning shaft, a pushing seat including a magnetic element, a pressing element and a sensing unit, wherein said positioning shaft, said pushing seat, said pressing element and said sensing unit are all accommodated within said housing, wherein said holder is fixed on said pressing element, said pressing element is rotatably fixed on an end of said positioning shaft, and said end of said positioning shaft is penetrated through said pushing seat and sustained against said pressing element, wherein when an external force is exerted on said pushing seat through said flexible sleeve, a distance between said pushing seat and said pressing element is changed, so that a change of a magnetic field of said magnetic element is received by said sensing unit.

20. The sleeve according to claim 19, wherein said unit structures are convex structures or concave structures, wherein said convex structures or said concave structures are not responsible for providing a function of being detected by said detecting module, wherein each of said convex structures or said concave structures has a geometric profile selected from at least one of a point shape, a block shape and a strip shape.

21. The sleeve according to claim 19, wherein said unit structures are convex structures or concave structures, wherein said convex structures or said concave structures are not responsible for providing a function of being detected by said detecting module, wherein said convex structures or said concave structures are regularly or irregularly distributed on said outer surface.

22. The sleeve according to claim 19, wherein said unit structures are convex structures or concave structures, wherein said convex structures or said concave structures are not responsible for providing a function of being detected by said detecting module, wherein said convex structures or said concave structures are continuously or discontinuously distributed on said outer surface.

23. The sleeve according to claim 19, wherein said sleeve is rotatable and/or movable on said holder, or said sleeve is rotatable and/or movable relative to at least one portion of said holder.

* * * * *